United States Patent [19]
Clark

[11] 3,752,551
[45] Aug. 14, 1973

[54] AUTOMOBILE TAPE CARTRIDGE DISPENSING CASE

[76] Inventor: Jim W. Clark, 2960 Lula Ln., Kennesaw, Ga. 30144

[22] Filed: Oct. 27, 1970

[21] Appl. No.: 84,279

[52] U.S. Cl....... 312/245, 206/19.5 R, 206/DIG. 36
[51] Int. Cl............................................ A47b 43/00
[58] Field of Search................... 232/43.1; 248/318, 248/311; 224/42.46, 42.45, 45 P, 45 R; 206/19.5 R, 56 AC, DIG. 8, DIG. 27, DIG. 36; 312/245, 248; 220/18

[56] References Cited
UNITED STATES PATENTS

| | | | |
|---|---|---|---|
| 2,256,204 | 9/1941 | Jameson | 248/318 X |
| 3,371,976 | 3/1968 | Ritz | 312/245 |
| 2,648,516 | 8/1953 | Manetti et al. | 348/311 |
| 592,781 | 11/1897 | Hertwig | 248/137 |
| 1,898,968 | 2/1933 | Wyland | 248/318 |
| 1,368,843 | 2/1921 | Rosenthal | 211/113 |
| 3,438,644 | 4/1969 | McMillan et al. | 220/18 |
| 3,443,851 | 5/1969 | Earl | 206/DIG. 36 |

Primary Examiner—Samuel B. Rothberg
Assistant Examiner—John M. Caskie
Attorney—Patrick F. Henry

[57] ABSTRACT

A plastic case arranged to hold a number of magnetic tape cartridges or cassettes for storing same in the automobile when not in use and to allow easy removal by hand when changing from one tape cartridge to another. A box-like case is made from sheet plastic material and is installed underneath the dash panel of an automobile by means of a U-shaped bracket made of plastic with notches on opposite ends into which is fitted a respective projecting plastic pin from opposite ends of the case. The case has a fixed U-shaped plastic handle on the top which serves as a carrying handle when the case is removed from the automobile support bracket and the handle also serves as a stop member to position the case against a projecting pin on the automobile installation bracket so that the front of the case faces properly to the automobile occupants to allow easy selection of the tape cartridge wanted and to permit easy removal thereof as well as insertion of other tape cartridges. The front of the case has tape cartridge slots at the top in a front faced plate and a curved shelf projecting from the bottom beneath bottom dispensing slots from which a tape cartridge is removed. A typical case would hold two stacks of four-tape cartridges each for a total of eight cartridges but cases can be made to hold larger or smaller numbers.

10 Claims, 5 Drawing Figures

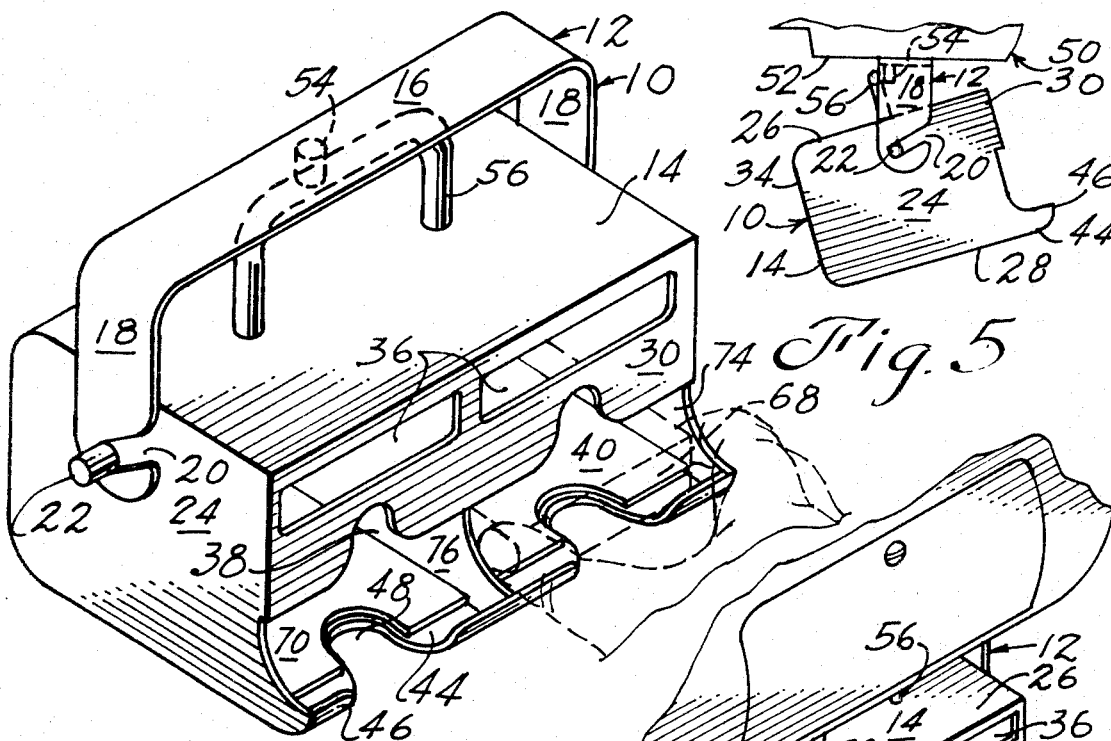
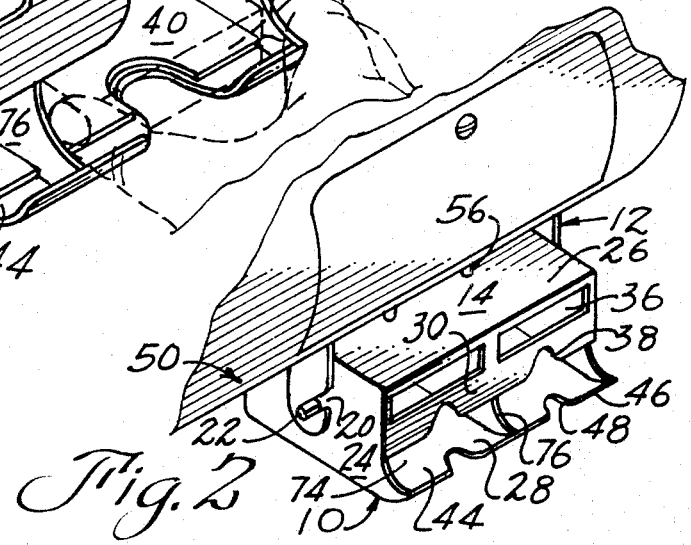
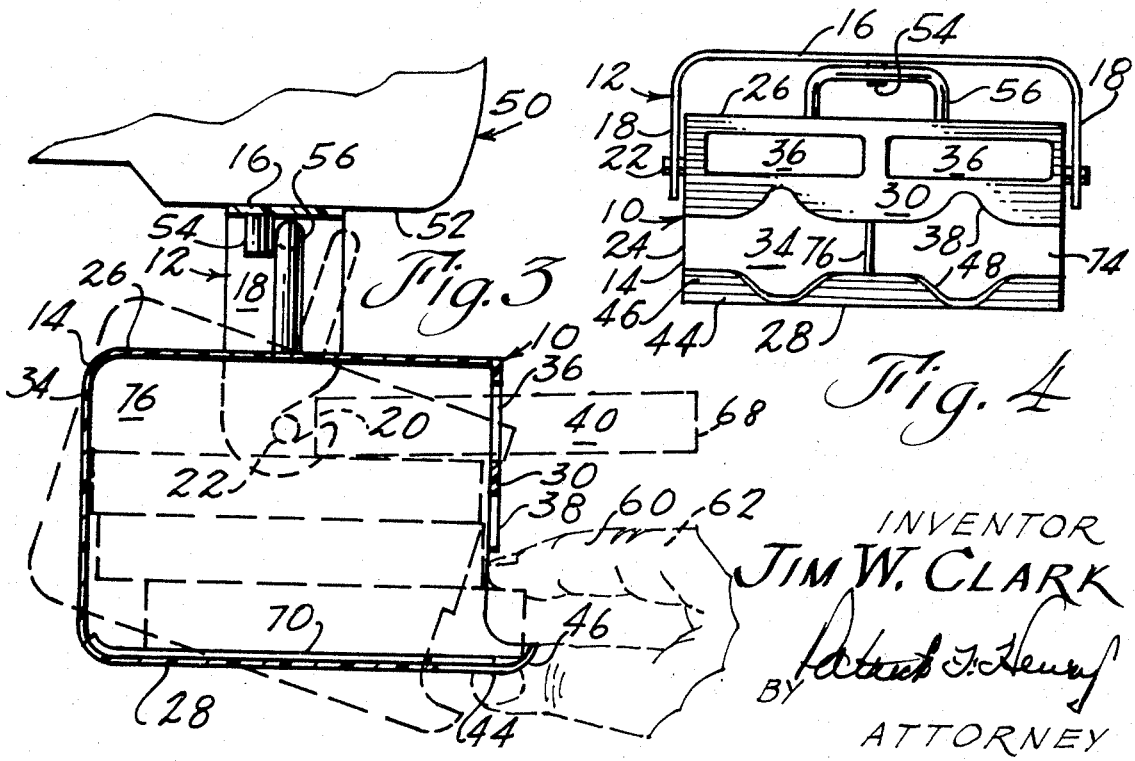

AUTOMOBILE TAPE CARTRIDGE DISPENSING CASE

BACKGROUND OF THE INVENTION

1. Field of the Invention

Special containers and cases that are mounted on brackets and removable therefrom, also in particular tape cartridge storage containers and similar cases.

2. Description of the Prior Art

The known prior art cases for this particular purpose are luggage-type cases made from stiff cardboard or the like covered with sheet plastic material with suitable dividers inside to separate the case into compartments for the storage of a number of tape cartridges or cassettes and provided with the usual luggage type fittings and closures either on the side or the ends. Such cases are intended to be carried on the seat or on the floor of the automobile and are not provided with any particular means for installation near the tape playback instrument, which is normally installed underneath the dash in the front of the automobile in front of the driver's seat and, like pieces of luggage, are in the way in the front seat and are not normally available for selection of tapes. It is sometimes awkward to hold such a case in the lap and open same and remove a particular tape cartridge and most difficult and unsafe for the driver while driving. This is especially true in smaller automobiles such as compact and sport cars. There is adequate space under the glove compartment or other area of the dash panel of the automobile to accommodate a removable case of the present type but none of the previous cases is either suitable for this purpose or provided with an arrangement to accomplish same.

SUMMARY OF THE INVENTION

Unlike the luggage-type cases which are stored on the seat or the floor of the automobile the present case is installed underneath the dash but it is easily removable therefrom to carry the tapes into the home or apartment to play on an instrument there and back again to the automobile or to prevent the tapes from being stolen from the automobile when parked. The tape cartridges are well protected inside the present box-like case from dust and dirt but at the same time the labels on the tapes are easily visible through the front and unlike the luggage-type cases that have hinged closures which must be opened, the present case has no hinged pivot or swinging closure or the like but only a front with slots into which tapes are inserted and other slots from which tapes are removed. Bracket installaton is quickly performed underneath the dash of the automobile and positioning of the case for proper viewing of the front is practically automatically accomplished when the case is hung on the slots in the bracket.

BRIEF DESCRIPTION OF THE DRAWINGS

FIG. 1 is a perspective view of a case made in accordance with the present invention mounted on the supporting installation bracket.

FIG. 2 is a perspective view of the case and bracket assembly shown in FIG. 1 mounted beneath the glove compartment of the dash of an automobile.

FIG. 3 is a cross-sectional view along FIG. 2 with dotted lines to illustrate limited movement of the tape case.

FIG. 4 is a front elevation view of the case shown in FIG. 3.

FIG 5 is a side elevation view illustrating an adjustment of the position of the case behind the stop pin.

DESCRIPTION OF A PREFERRED EMBODIMENT

The entire assembly is designated by reference numeral 10 and comprises the bracket 12 and the case 14 which as mentioned previously are separable from one another. Bracket 12 is constructed from a piece of flat plastic material bent on opposite ends to provide a flat portion 16 in the middle with opposed end portions 18 extending approximately 90° therefrom. Each end portion 18 is flat and is provided with an angular notch 20 into which is fitted the respective pin 22 that is made from a round plastic dowel attached to the sides 24 of the case 14.

Case 14 is manufactured from sheet plastic that is molded or fabricated from individual plastic pieces to provide the sides 24, a flat top 26, a flat bottom 28 and a front panel or plate 30 which partially covers the front space provided between the sides 24, top 26 and bottom 28. The back is covered and closed by a back plate or cover member 34. The front plate 30 includes insertion slots or windows 36 of a pre-selected size to accommodate either a tape cartridge or a tape cassette depending upon what is to be used. The bottom edge of the plate 30 is formed with indentations 38 which assist in accommodating the fingers of the hands for removal of the tape cartridges which are designated by reference numeral 40 herein. Bottom 28 extends beyond the front plate 30 providing a shelf 44 with upturned front edges 46 and further indentations or notches 48 which accommodate the fingers and assist in lefting the tape cartridges 40 from the shelf 44.

The bracket 12 may be installed by means of sheet metal screws into the metal or cardboard portion of a typical automobile dash designated by reference numeral 50 and including a flat or slightly curved surface 52 against which the flat portion 16 of the bracket 12 is held and screwed into place. Portion 16 is provided on the under surface thereof with a pin or dowel stop member 54 which is engaged by a plastic handle 56 attached to the top 26 of the case 14.

Depending upon the angularity of the surface 52 of the dash 50 the pins 22 on the case 14 are so located with respect to the approximate center of gravity of the case when loaded with some tapes as to cause the tape case 14 to tilt back to bring the handle 56 into engagement with the pin 54 as shown in FIG. 3 but this is easily moved or tilted in the other direction by means of the fingers 60 of a hand 62 shown in FIG. 3. Also, if it is desired to have the face plate 30 angled upwardly more to the occupant of the front seat of the vehicle then the handle 56 may be installed when the case 14 is placed on the bracket 12 behind the pin 54 and the weight of the tape case 14 will either hold it in this position or it will travel to this position and stop when the vehicle is in motion.

The tape cartridges 40 (sometimes called tapes) may be inserted through the windows 36 to stack one on top of the other on each of the sides of the particular case 14 shown in the drawings so that the edge of the tape cartridge 68 which has the label on it with the name of the particular music and performer on the tape facing toward the occupants of the front seat of the automobile so that tapes may be removed from the bottom dispensing openings on either side formed by the bottom edge of the plate 30 and the top of shelf 44 on which may be placed a cushion member 70 of thin foam material, felt or similar cushion sheet. The tape cartridges 40 are readily removed through the large opening designated by reference numeral 74 in the drawings. As seen in FIG. 1 the tape cartridge may be grasped on opposite sides by the index finger and the thumb or as seen in FIG. 3 the tape may be grasped at the front by the index finger on the top and the thumb on the bottom depending upon the particular preference of the operator and the position of the person changing the tape cartridges. A center separator plate 76 may be placed between the stacks of tapes to prevent excessive noise, rattling and bumping of the tapes against each other. This wall may be provided with cushion materials 70 if desired.

The case 14 is not completely rigidly mounted in the automobile since it is swinging in the notches 20 and the bracket 12 on the respective pins 22 and is allowed a certain amount of forward and rearward motion depending upon the relationship between the handle 56 and the stop member 54 so that in some situations of angularity of the dash 50 and the surface 52 the tapes will not rattle and shake inside the case every time the automobile accelerates and decelerates but small amounts of motion in both directions will be compensated for by a slight swinging of the case on the bracket 12. Also a slight bumping of the case by the feet or other portions of the body of the occupants of the vehicle will not tend to dislodge the bracket 12 as readily as if there were a rigid installation. The case 14 is readily removable simply by lifting same from the notches 20 in the bracket 12 by holding the handle 56 and is re-installed and re-inserted in the reverse in a similar manner.

While I have shown and described a particular embodiment of this invention, this is by way of illustration only and does not constitute any sort of limitation on the scope since various alterations, changes, deviations, eliminations, substitutions, additions, omissions, departures and changes may be made in the embodiment shown without departing from the scope of the invention as defined by interpretation of the appended claims.

What is claimed is:

1. A tape cartridge or cassette case for automobiles comprising:
    a. a support bracket attached to the under surface of the dash of the automobile,
    b. a three-dimensional tape case having a tape compartment therein and a portion of the front having tape insertion slots and tape removal openings,
    c. means supporting said case removably on said bracket, said means including a readily dispengageable engagement between said case and said bracket whereby said case may be easily and quickly removed and replaced without unbolting bolts or unscrewing fasteners and the like, so that the case may be carried with tapes to be played elsewhere and returned to the automobile with ease and convenience,
    d. and means positioning the case with respect to the bracket for viewing, inserting or removing the tapes through the front of said case,
    e. a handle on said case and a stop member on said bracket, said handle engaging said stop member to locate the position of the front of the case.

2. The device in claim 1, wherein said bracket includes opposite ends extending from said automobile dash,
    there being notches in said ends and projecting members on opposite sides of said case positioned in said slots.

3. The device claimed in claim 1, wherein said installation bracket comprises a substantially flat strip and portions projecting from opposite ends thereof,
    and means on said case for mounting same on the ends of said bracket for removal therefrom.

4. The device claimed in claim 1:
    wherein said front of said case is partially closed by a flat plate member which defines openings providing the tape insertion slots, said plate providing a space between one edge thereof and the bottom of the front of the case from which tapes are removed.

5. The device claimed in claim 4:
    the bottom of said case projecting beyond the front thereof at the bottom providing a ledge from which tapes may be removed from said case.

6. The device claimed in claim 1:
    the tape case being removably supported on said bracket for removal therefrom.

7. The device in claim 6:
    said tape case having means inserted in said bracket and removable therefrom to support said case thereon.

8. The device in claim 7:
    said case being supported on said means on opposite ends thereof for limited movement on said bracket and stop means on said case engaging said bracket to prevent unlimited movement of said case and to position said case for use.

9. The device in claim 8:
    said bracket having a notch on each end and said case having a projection on each end fitting into said notch.

10. The device in claim 9:
    said stop means being a pin on the bracket engaging said handle on the top of the case.

* * * * *